United States Patent

Pickering et al.

[11] Patent Number: 5,526,934
[45] Date of Patent: Jun. 18, 1996

[54] WICKETLESS PLASTIC BAG PACK WITH TAPERED WELD HOLE

[75] Inventors: Gordon F. Pickering, Lyons; Bruce R. Wilkes, Mendon, both of N.Y.

[73] Assignee: Huntsman Packaging Corporation, Salt Lake City, Utah

[21] Appl. No.: 235,499

[22] Filed: Apr. 29, 1994

[51] Int. Cl.⁶ .................................................. B65D 33/14
[52] U.S. Cl. .............................. 206/554; 383/9; 383/37
[58] Field of Search .............................. 206/554; 383/8, 383/9, 37

[56] References Cited

U.S. PATENT DOCUMENTS

| | | | |
|---|---|---|---|
| 4,046,257 | 9/1977 | Lehmacher | 206/554 |
| 4,106,734 | 8/1978 | Walitalo . | |
| 4,165,832 | 8/1979 | Kuklies et al. . | |
| 4,274,539 | 6/1981 | Rabeneck et al. | 206/554 |
| 4,493,419 | 1/1985 | Prader et al. . | |
| 4,557,384 | 12/1985 | Membrino . | |
| 4,560,067 | 12/1985 | Reimann | 206/554 |
| 4,744,200 | 5/1988 | Benoit, Jr. et al. | 206/554 X |
| 4,769,126 | 9/1988 | Roen et al. | 206/554 |
| 4,785,938 | 11/1988 | Benoit, Jr. et al. . | |
| 4,796,759 | 1/1989 | Schisler . | |
| 4,854,451 | 8/1989 | Jensen | 206/554 |
| 4,989,732 | 2/1991 | Smith . | |
| 5,183,158 | 2/1993 | Boyd et al. | 206/554 |

*Primary Examiner*—Bryon P. Gehman
*Attorney, Agent, or Firm*—Russell R. Stolle; Ron D. Brown; Donald Bollella

[57] ABSTRACT

A wicketless pack of thermoplastic bags includes a stack of a number of individual thermoplastic bags. Each of the bags has a bottom edge, upper and lower walls, a pair of side edges, and an open top end. A lip segment is provided adjacent the open end of each individual bag. The lip portion is an extension of the material forming the lower wall of a respective bag and includes at least one locating hole. A perforated tear line is formed between the open end of the bag and the lip portion. The lip segments of the stack are bonded together with ultrasonic vibratory energy to form a welded pad of lips as part of the bag pack. The welded pad is formed by moving at least one shaped ultrasonic horn downward through the stack of consecutive lips while activating the shaped horn with ultrasonic vibratory energy to form a continuous tapered weld through the stack of lip portions.

5 Claims, 4 Drawing Sheets

WICKETLESS PLASTIC BAG PACK WITH TAPERED WELD HOLE

BACKGROUND OF THE INVENTION

1. Field of the Invention This invention relates in general to plastic bag packs and, in particular, to a wicketless plastic bag pack and a method for making the pack. More specifically, but without restriction to the particular embodiment hereinafter described in accordance with the best mode of practice, this invention relates to ultrasonic assembly of a wicketless plastic bag pack that utilizes a minimum of disposable shipping materials.

2. Discussion of the Prior Art

The art of assembling bag packs employed in automated industrial bagging operations for packaging products like bread, or other consumer goods, typically involves bundling a stack of bags between two supporting boards with a disposable wicket secured by grommets.

The thermoplastic bags customarily used for packaging consumer products include a bottom edge which may be gussetted, top and bottom walls or front and back walls, depending on the orientation of the bag, a pair of side edges, and an open top end. The material forming the bottom or back wall has a lip portion extending beyond the open end of the bag. A perforated tear line may be formed between the open end of the bag and its lip portion. This tear line allows the bag to be removed from the lip portion as required during bagging operations. The lip portion is also provided with a pair of locating holes. As an alternative to the perforated tear line, top notches may be formed above the locating holes so that the bag may be torn through the notches during the bagging operation. In the assembly process of the bag pack, a U-shaped wicket is inserted through two corresponding locating holes in a first supporting board. As the thermoplastic packaging bags issue off the production line, they are consecutively stacked upon the first support board with their respective locating holes placed over the extending prongs of the wicket. Once a desired number of thermoplastic bags is stacked upon the first board, a second supporting board with corresponding locating holes is placed over the wicket prongs to cover the top of the stack. Rubber grommets are moved down the wicket prongs to securely sandwich the stack of thermoplastic bags between the supporting boards. The bag pack is shipped in this condition to the industrial producer. Bagging equipment utilized by the industrial producer includes a wicket holder for positioning the stack of bags in relation to the production line. Pressurized air is employed to open the next consecutive bag on the pile so that product issuing off the production line is directed into the bag. The filled bag is then removed from the equipment wicket by tearing the bag from its lip portion along the perforated tear line or by tearing through the top notches above the locating holes. When the bagging equipment needs a resupply of bags, an equipment operator removes the rubber grommets and supporting boards from a new bag pack and places the new stack of bags on the wicket holder of the bagging equipment.

Use of this type of prior thermoplastic bag pack involves a waste of packing materials since the rubber grommets, supporting boards, and bag pack wickets are discarded when the stack of bags is mounted on the bagging equipment. In addition to this drawback, costly operator time is required in removing these materials from each bag stack. A further limitation relating to lost time is possible separation of the individual bags from the bag stack. Bagging machine downtime is caused by loose bags which can cause product to miss proper placement into a respective bag. This may result in an unwanted slow-down of the production line. Lastly, industrial producers encounter the cost of disposal in properly storing and hauling away the accumulation of these packing materials.

OBJECTS AND SUMMARY OF THE INVENTION

It is, therefore, an object of the present invention to improve thermoplastic bag packs, the individual bags thereof being employed to package consumer goods.

Another object of this invention is to improve the method for making a thermoplastic bag pack of which individual bags are used for packaging consumer goods.

It is a further object of the present invention to minimize waste associated with using thermoplastic bag packs in industrial bagging operations.

Still another object of the present invention is to reduce the cost of assembling a pack of thermoplastic bags by eliminating the need for packing materials required by the stack of bags.

It is yet a further object of the present invention to reduce operator time required to mount a pack of thermoplastic bags to industrial bagging equipment.

Yet another object of the present invention is to eliminate the possibility that individual bags in a pack of thermoplastic bags become separated from the pack prior to loading the bag pack on bagging equipment.

An additional object of the present invention is to utilize ultrasonic vibratory energy to weld together the respective lip portions of individual bags in a stack of thermoplastic bags to form an easily transported bag pack with a minimum amount of wasted packing material.

Yet a further object of the present invention is to reduce the cost of disposal associated with storing and hauling away accumulations of waste materials produced by continual use of thermoplastic bag packs in industrial bagging operations.

These and other objects are attained in accordance with the present invention wherein there is provided a wicketless pack of thermoplastic bags. The present bag pack includes a stack of individual thermoplastic bags. Each of the bags in the stack is consecutively arranged and has a bottom edge, upper and lower walls, a pair of side edges, and an open top end. In accordance with one aspect of the present invention, a lip segment is provided adjacent the open end of each individual bag. The lip portion is an extension of the material forming the lower wall of a respective bag and includes at least one locating hole. A perforated tear line is formed between the open end of the bag and the lip portion so that the bag may be easily removed from the lip. In accordance with the method of the present invention, the lip segments of the stack are bonded together in specific localized areas using ultrasonic energy to form a welded lip pad as part of the present bag pack. At least one locating passageway is provided through the welded pad so that the bag pack is quickly and easily mounted on the wicket of industrial bagging equipment. The passageway through the welded pad is formed through the thickness of the pad by virtue of the locating holes of consecutive lips being in register or by accurate location of the weld itself. According to another aspect of the method of the present invention, the welded pad is formed by moving at least one shaped ultrasonic horn downward through the stack of consecutive lips while simultaneously activating the shaped horn with ultrasonic vibratory energy to form a continuous tapered weld through the stack of consecutive lip portions.

BRIEF DESCRIPTION OF THE DRAWING

Further objects of the present invention together with additional features contributing thereto and advantages accruing therefrom will be apparent from the following description of a preferred embodiment of the invention which is shown in the accompanying drawing with like reference numerals indicating like components throughout, wherein.

DETAILED DESCRIPTION OF THE PREFERRED EMBODIMENT

Figure 1:
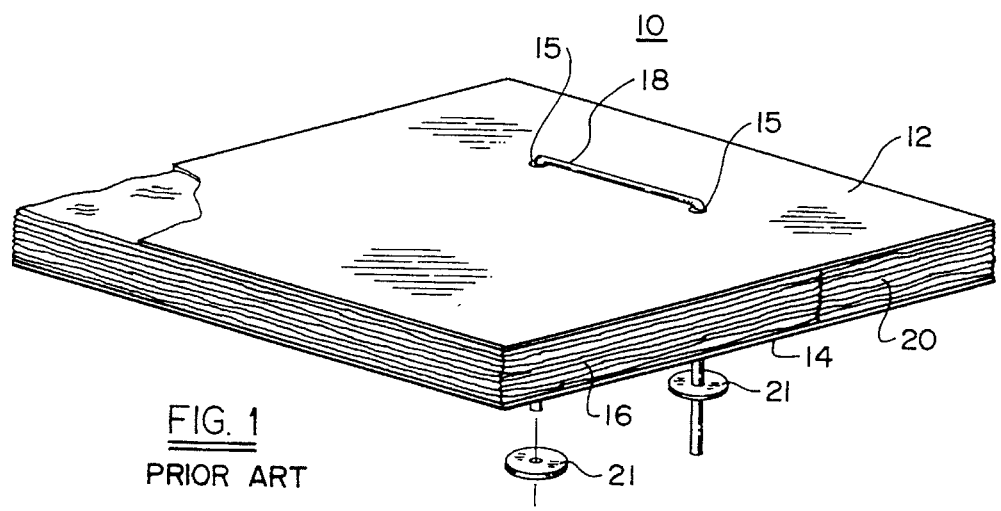
FIG. 1 is a perspective view of a pack of thermoplastic bags according to the prior art.

Referring now to FIG. 1, there is shown a prior art pack of thermoplastic bags generally referenced 10. The pack 10 includes a first supporting board 12 and a second supporting board 14. A pair of locating holes 15—15 are formed in the first board 12, while the second board 14 includes a similar pair of locating holes (not shown). The prior art pack 10 also includes a stack of thermoplastic bags 16 and a disposable wicket 18 which is inserted through the locating holes 15—15 and a stack of consecutive lip portions 20 in a known manner. The wicket 18 is then secured against the second board 14 by rubber grommets 21, which are moved over the wicket 18 to sandwich the stack of bags 16 and lip portions 20 between the two supporting boards 12 and 14.

Figure 2:
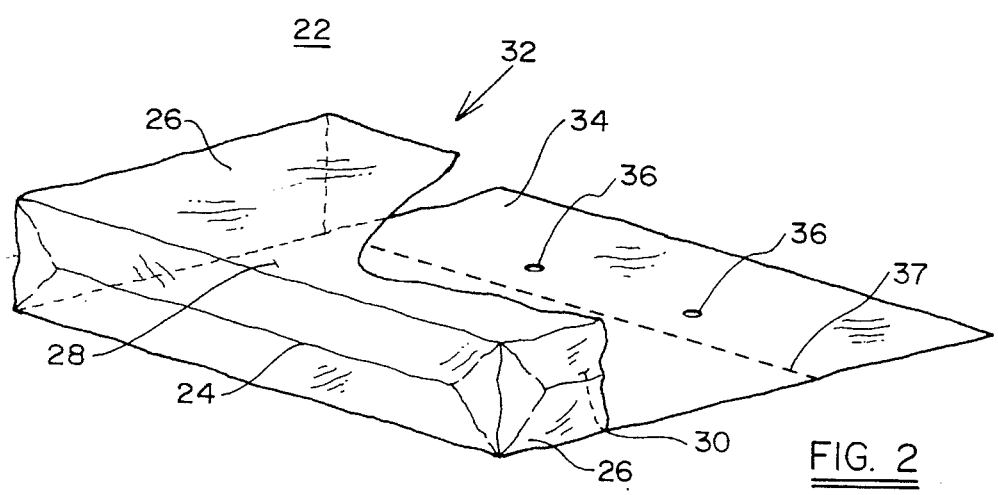
FIG. 2 is a perspective view of a of an individual thermoplastic bag used in conjunction with the present invention.

With reference to FIG. 2, there is shown an individual thermoplastic bag generally referenced 22 which is used in conjunction with the present invention. The thermoplastic bag 22 includes a bottom edge 24, a pair of side edges 26—26, a front or upper wall 28, a back or lower wall 30, and an open top end 32. The thermoplastic bag 22 also includes a lip portion or segment 34 which includes a pair of locating holes 36—36. As can be seen in FIG. 2, the lip portion 34 is an extension of the thermoplastic material forming the bottom wall 30. A perforated tear line 37 is formed between the lip portion 34 and the open top end 32 of the bag 22 so that the bag may be easily removed from the lip portion.

Figure 3:
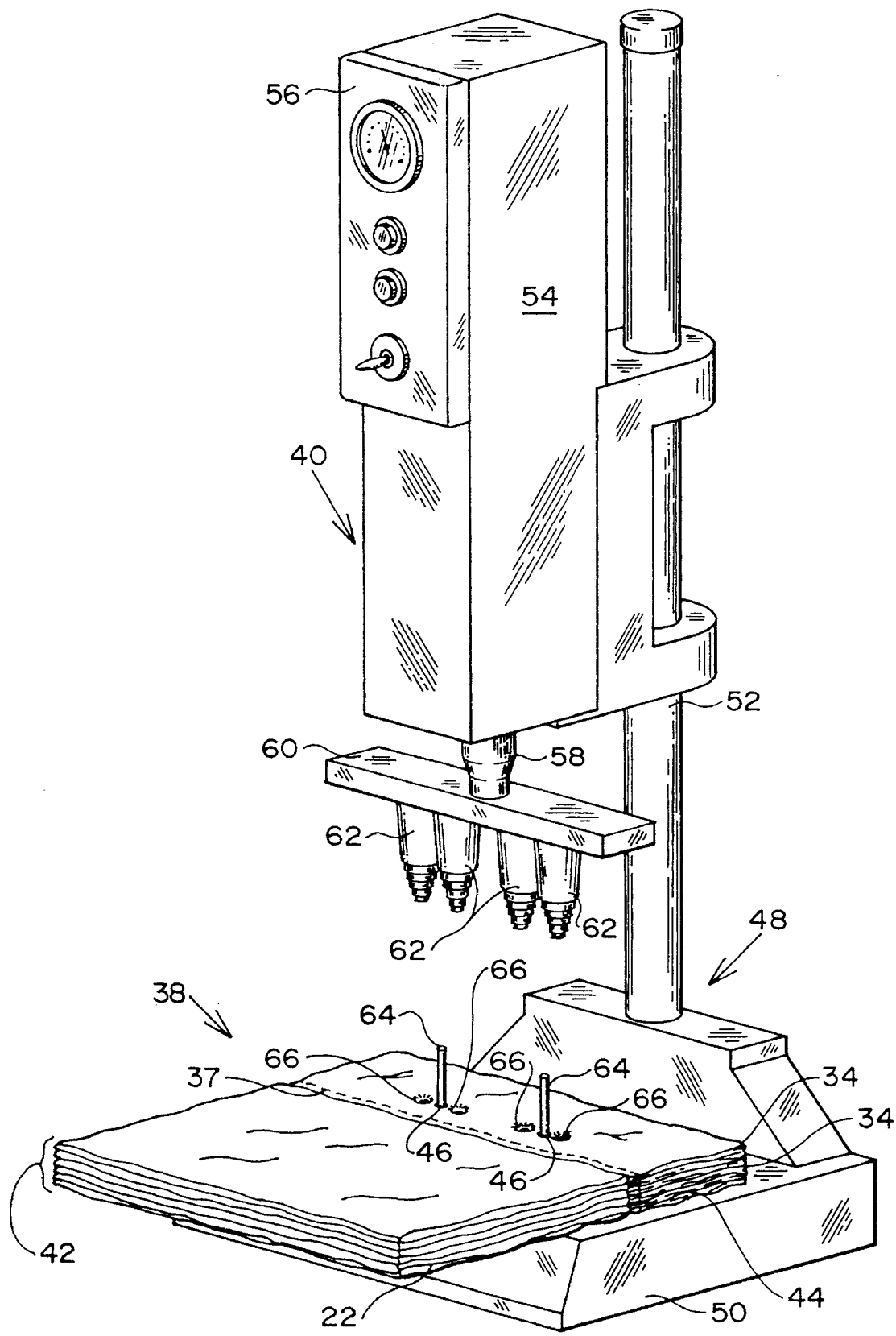
FIG. 3 is a perspective view of a pack of thermoplastic bags according to the present invention shown in conjunction with an ultrasonic welding device as used in accordance with the method of this invention.

FIG. 3 shows a pack of thermoplastic bags 38 according to the present invention in conjunction with an ultrasonic welding device 40, as used in accordance with the method of this invention. The pack 38 includes a stack of a predetermined number of thermoplastic bags 42 and a welded or bonded pad of lip segments 44. The pack 38 includes a pair of locating passages 46—46 formed through the welded pad 44. As would be apparent to one skilled in the art, the locating passageways 46—46 are formed by the locating holes 36—36 being in register with one another by virtue of the thickness of the welded pad 44.

The ultrasonic welding device 40 includes a base assembly 48 having a support base 50 and a rigid support column 52. The welding device 40 also includes an ultrasonic actuator 54 having a control panel 56 which includes related control and display means. The ultrasonic actuator 54 is provided with a mounting adaptor or neck portion 58 which is adapted to receive a back driver or block segment 60. In accordance with one aspect of the present invention, the back driver 60 of the ultrasonic actuator 54 includes shaped ultrasonic horns 62. The driver 60 and the horns 62 together form the horn assembly for the welding device 40. A reusable wicket 64 is temporarily provided to properly align and locate the stack of thermoplastic bags 42 relative to the shaped ultrasonic horns 62. The welded pad 44 of lip segments 34 is bonded together by tapered or cone-shaped ultrasonic welds 66 which will be described in further detail below.

Figure 4:
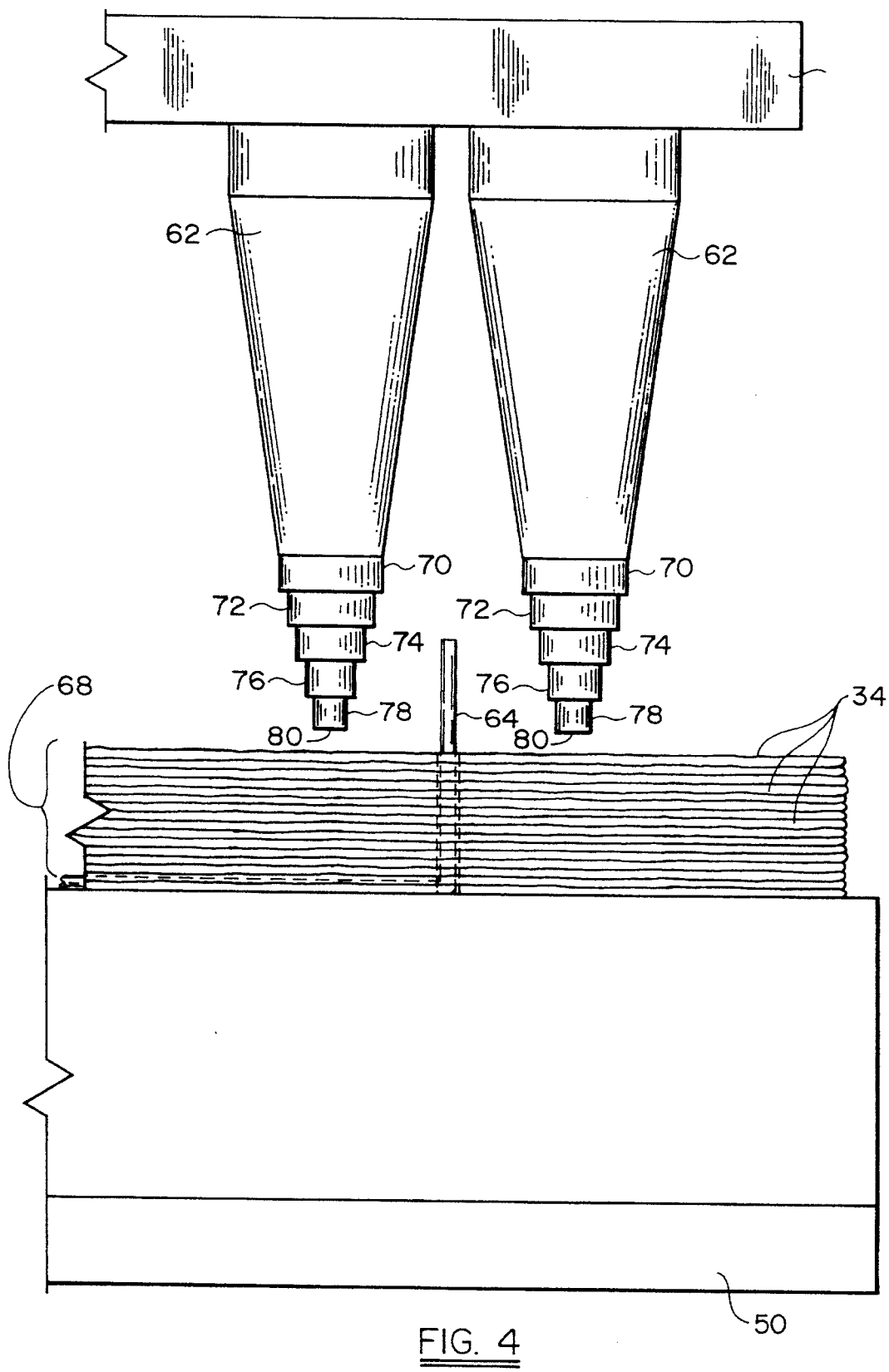
FIG. 4 is an isolated front elevation view of the bag pack and welding device of FIG. 3.
Figure 5:
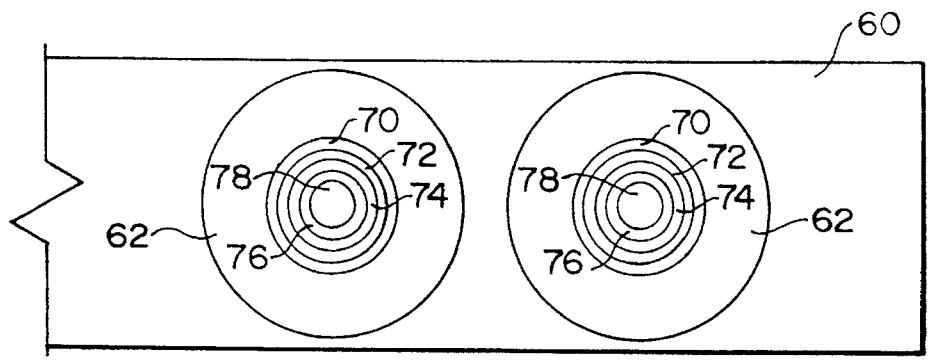
FIG. 5 is a partial plan view of the shaped ultrasonic horns used in accordance with the present method for making the wicketless plastic bag pack according to this invention.

Prior to forming the pack of thermoplastic bags 38, a loose stack of lip segments 68 is secured by the reusable wicket 64 and positioned on the base 50 of the ultrasonic welding device 40 as shown in FIG. 4. The loose stack of lip segments 68 is formed by a number of individual lip segments 34 from the individual thermoplastic bags 22. As shown in further detail in FIGS. 4 and 5, the shaped ultrasonic horns 62 each preferably include a first concentric ring 70, a second concentric ring 72, a third concentric ring 74, a fourth concentric ring 76, and a fifth concentric ring 78. Each horn 62 also includes a tip portion 80 which is coincident with the distal end of the fifth concentric ring 78.

Figure 6:
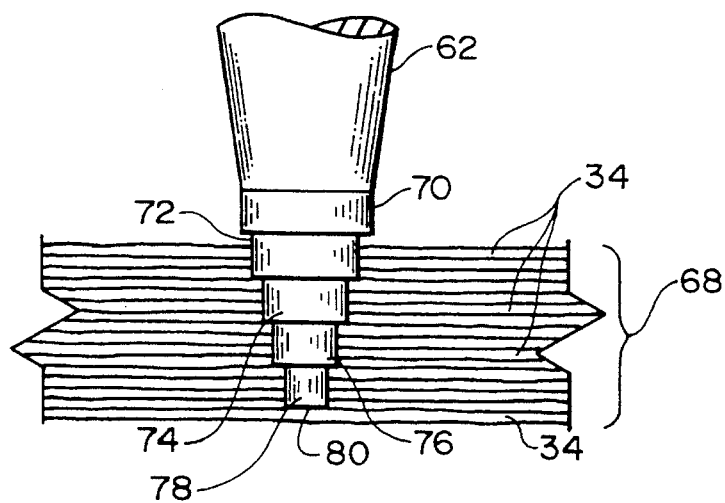
FIG. 6 is a detailed cross sectional view of one of the shaped ultrasonic horns of FIG. 4 shown driven into a stack of thermoplastic bag lips in accordance with the method of the present invention.
Figure 7:
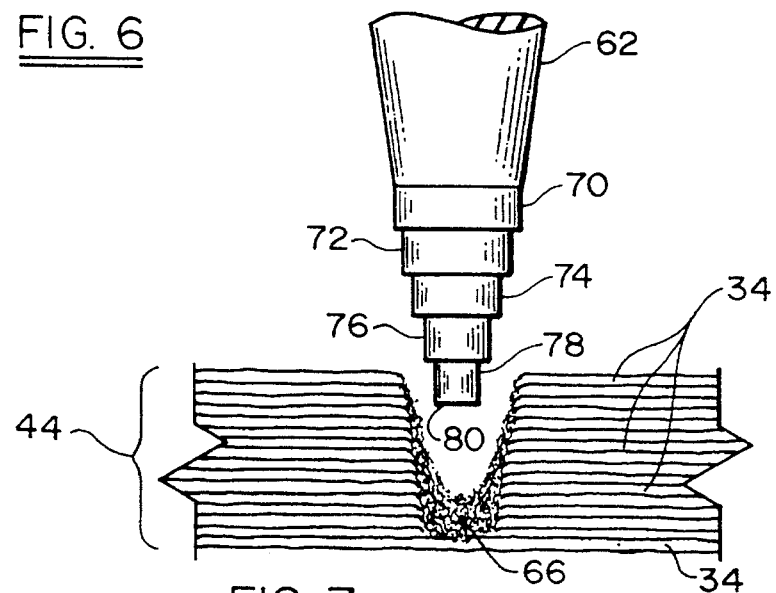
FIG. 7 is a view similar to FIG. 6 showing the shaped ultrasonic horn removed from the stack of lips after forming a weld therein.

With reference now to FIGS. 6 and 7, the method according to the present invention will be described in detail with reference to forming the pack of thermoplastic bags 38. FIG. 6 shows the shaped ultrasonic horn 62 as driven into the loose stack of lip segments 68. As can be seen in FIG. 6, the concentric rings 70, 72, 74, 76, and 78 move through the thermoplastic of the stack 68 until the tip 80 of the ultrasonic horn 62 is in intimate contact with the last lip segment 34 in the stack 68. While the ultrasonic horn 62 is being moved into the position shown in FIG. 6, the ultrasonic actuator 54 is actuated with ultrasonic vibratory energy. After a predetermined cycle of ultrasonic energy, the shaped ultrasonic horn 62 is removed from the stack of lip segments, which has been transformed to the welded pad of lip segments 44 as shown in FIG. 7. After the welded lip pad 44 is formed, the reusable wicket 64 is removed from the pack 38 and held for later use in welding other bag packs. As shown in further detail in FIG. 7, the cone-shaped ultrasonic weld 66, by virtue of the shape of the concentric horn rings, forms a bond or weld through the stack 44 so that the individual lip segments 34 are consecutively bonded to each other throughout the pad 44. The placement of the welds 66 is preferably adjacent each of the locating passageways 46 so that the corresponding locating holes 36 are maintained in register with each other. In this manner, the locating passageways 46 remain semi-rigid so that the bag pack 38 may be quickly and accurately mounted on the wicket holder of the bagging equipment while the bags 22 are prevented from falling loose prior to mounting. In the preferred embodiment of this invention, the ultrasonic welding device 40 is provided with four horns 62 while the pad 44 includes two locating passageways 46 which are positioned to accommodate the standard wicket used in industrial bagging equipment. The four horns 62 are positioned on the back driver 60 in such a manner as to place a pair of welds 66 adjacent each locating passageway 46.

There has thus been shown and described a useful and novel wicketless plastic bag pack and method for making the pack in such a manner that reduces waste materials and installation time associated with employing the bag pack in industrial bagging equipment.

While this invention has been described in detail with reference to a certain preferred embodiment, it should be appreciated that the present invention is not limited to that precise embodiment. Rather, in view of the present disclosure which describes the best mode for practicing the invention, many modifications and variations would present themselves to those of skill in the art without departing from the scope and spirit of this invention, as defined in the following claims.

What is claimed is:

1. A wicketless pack of thermoplastic bags comprising:

a stack of a plurality of thermoplastic bags, each bag being consecutively arranged in the stack and having a bottom edge, upper and lower walls, a pair of side edges, and an open top end;

a lip segment formed adjacent the open end of each individual bag, said lip segment being an extension of the lower wall of a respective bag, each bag being removable from its respective lip segment along a perforated tear line formed between the open end of the bag and the lip segment;

a pad of said lip segments bonded together by a continuous tapered weld hole passing through a portion of the pad of lip segments and passing through a plurality of said lip segments; and a locating passageway formed through the bonded pad being positioned adjacent said continuous tapered weld 2. The wicketless pack of thermoplastic bags according to claim 1 including two locating passageways formed through the bonded pad of lip segments.

3. The wicketless pack of thermoplastic bags as recited in claim 1, including at least one additional said continuous tapered weld hole through the pad of lip segments.

4. The wicketless pack of thermoplastic bags as recited in claim 2, including at least one additional said continuous tapered weld hole through the pad of lip segments.

5. A wicketless pack of thermoplastic bags comprising:

a stack of a plurality of thermoplastic bags, each bag being consecutively arranged in the stack and having a bottom edge, upper and lower walls, a pair of side edges, and an open top end;

a lip segment formed adjacent the open end of each individual bag, said lip segment being an extension of the lower wall of a respective bag, each bag being removable from its respective lip segment along a perforated tear line formed between the open end of the bag and the lip segment;

a pad of said lip segments bonded together by a plurality of continuous tapered weld holes each passing through a portion of the pad of lip segments and passing through a plurality of said lip segments; and said passageway being positioned adjacent to and between a respective pair of the continuous tapered welds.

* * * * *